Sept. 27, 1927.

R. L. CAWOOD 1,643,874

PULVERIZER

Filed Nov. 14, 1925

INVENTOR
RICHARD L. CAWOOD
BY
ATTORNEYS

Patented Sept. 27, 1927.

1,643,874

UNITED STATES PATENT OFFICE.

RICHARD L. CAWOOD, OF EAST LIVERPOOL, OHIO.

PULVERIZER.

Application filed November 14, 1925. Serial No. 69,024.

My invention relates to pulverizers, and particularly to a high speed impact pulverizer. Among the objects of my invention may be mentioned—

(1) The elimination of bearings in the casing of the pulverizer, or immediately adjacent the same;

(2) The mounting of the pallets directly upon a stud end extension of the driving shaft into the pulverizer casing;

(3) The provision of a resilient lining for the casing;

(4) The provision of resilient facings for the high speed pallets.

My invention is illustrated in the accompanying drawings of a high speed impact pulverizer, in which—

Figure 1:
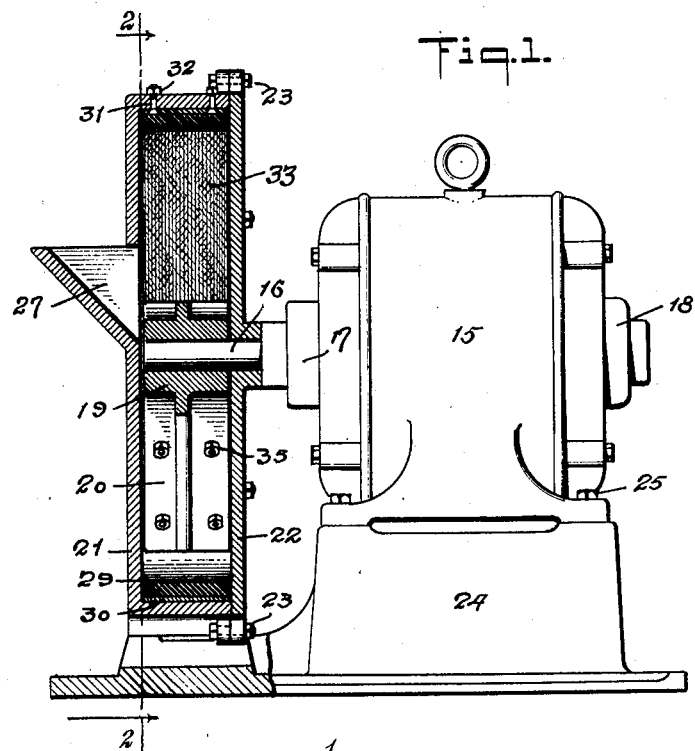
Fig. 1 is a side elevation partially in section through a pulverizing unit.
Figure 2:
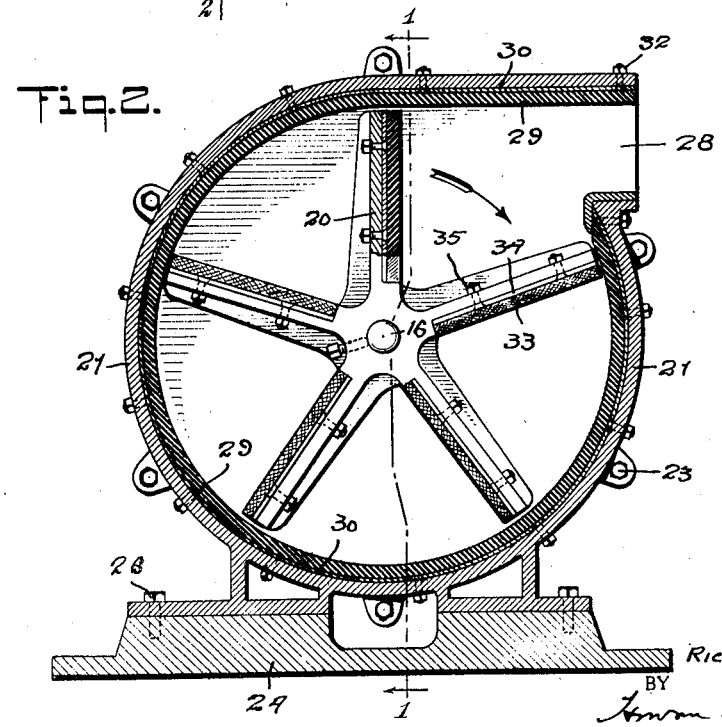
Fig. 2 is a section on the line 2—2, Fig. 1.

In high speed impact pulverizers of the present type, the practice heretofore has been to connect the motor with the rotary pallets of the pulverizer through a flexible coupling, and the hub of the pallets has been mounted on a shaft journalled in bearings in the pulverizer casing. The casing has commonly been cast and provided with a renewable metal lining. The rotary pallets have commonly been made of steel. In spite of this they rapidly wear out and in practice require replacement every month, when the mill is in constant use; while the casing lining lasts at best only a few months and must then be renewed. The bearings in the casing rapidly become worn, since it is practically impossible to make them perfectly dust proof, and this wear at the bearings results in misalignment of the pallet shaft wth respect to the driving shaft. The friction at the bearings and the weight of the parts have been such that considerable power is necessary for the drive.

The present invention not only greatly reduces the power consumption of the mill, but eliminates the troublesome bearings and flexible connections, as well as providing a casing lining and pallet facings, far more durable than the hardest steel, and readily and inexpensively replaced when worn.

As here shown the pulverizer unit comprises an electric motor 15, the rotor of which is mounted on a shaft 16. This shaft is extended beyond the motor bearings 17 and 18 to form a stud end to which is directly secured the hub 19, from which the radial pallets 20 extend. The pulverizer two-part casing comprises a drum 21 with removable head 22 bolted thereto at 23.

Both motor and casing are mounted upon a common base 24 having an upper level upon which the motor is secured by bolts 25, and a lower level upon which the drum is mounted by bolts 26.

A feed chute 27 opens through one side of the casing and discharges material to the pulverizing chamber in a direction transverse to the plane of rotation of the pallets 20. A peripheral discharge opening 28 is afforded through which the pulverized material is discharged by centrifugal action.

The peripheral wall of the drum is lined with soft rubber 29. This lining is preferably formed by vulcanization upon a long sheet metal strip 30, preferably resilient, which is flexed to the curvature of the periphery of the chamber and extends to the discharge opening 28. The strip 30 may be secured in any appropriate fashion, for example by bolts 31 riveted thereto, with their threaded stems projecting outwardly to pass through registering apertures in the periphery of the drum 21. The projecting ends of the bolts are engaged by nuts 32 exterior to the drum. Any other appropriate means may be used to hold the rubber lining securely in position.

Similarly each of the pallets 20 is provided with a soft rubber facing 33, vulcanized upon a sheet metal strip 34 bolted at 35 to the impact face of the pallet.

At the high speed of rotation at which the pallets are driven, viz, from 1200 to 3000 revolutions per minute, the rubber facing pads 33 do not impair the reducing action of the pallets, while their period of serviceability is far in excess of the best metal pallets heretofore used. Moreover, replacement is quickly and easily accomplished both as to the drum lining and pallet facings.

The elimination of the pallet shaft bearings at the side walls of the casing, materially reduces cost of construction as well as removing this source of trouble. The load imposed upon the motor is far less than in the old type pulverizers, and much less horse power is required for operating the mill.

The particular construction shown is merely illustrative of my underlying thoughts, and various modifications which do not depart from what I claim as my invention will occur to those dealing with the construction.

I claim—

1. A high speed impact pulverizer comprising a casing, high speed rotary pallets within the casing, and an inner peripheral lining of rubber for the casing, together with a metallic carrier for said lining, and means for detachably clamping said carrier with its attached rubber lining to the casing.

2. In a pulverizing mill, a casing and a lining therefor comprising a readily detachable rubber faced flexible metal strip, and means for securing said rubber faced lining strip against the inner periphery of the casing, with its rubber face exposed.

3. In a pulverizing mill, a high speed rotary pallet and a facing therefor, comprising a sheet metal strip, rubber vulcanized to said strip, and readily detachable means for securing said strip to the impact face of the pallet to provide a resilient impact surface therefor.

4. As a lining element of the type described, a sheet metal plate, rubber vulcanized to one face thereof, and means carried by the plate and projecting from its opposite face for securing the same to a support.

5. As a lining element of the type described, a flexible sheet metal plate, rubber vulcanized to one face thereof, and means carried by the plate and projecting from its opposite face for securing the same to a support.

6. As a lining element of the type described, a sheet metal plate, rubber vulcanized to one face thereof, and screw bolts carried by the plate and having threaded stems projecting from its opposite face to receive screw nuts by which the plate may be detachably clamped to a support perforated to permit the passage of said threaded stems therethrough.

In testimony whereof I have signed my name to this specification.

RICHARD L. CAWOOD.